J. J. PREECE.
APPARATUS FOR RAISING AUTOMOBILES.
APPLICATION FILED AUG. 26, 1912.
1,080,581.
Patented Dec. 9, 1913.
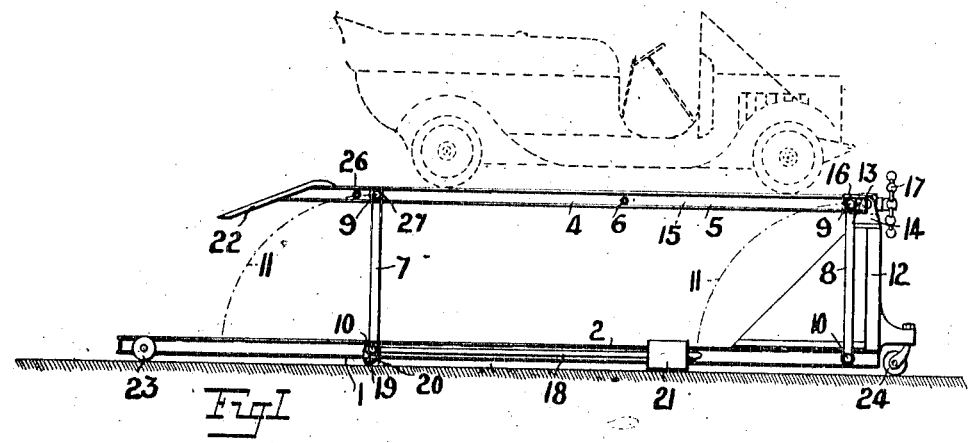
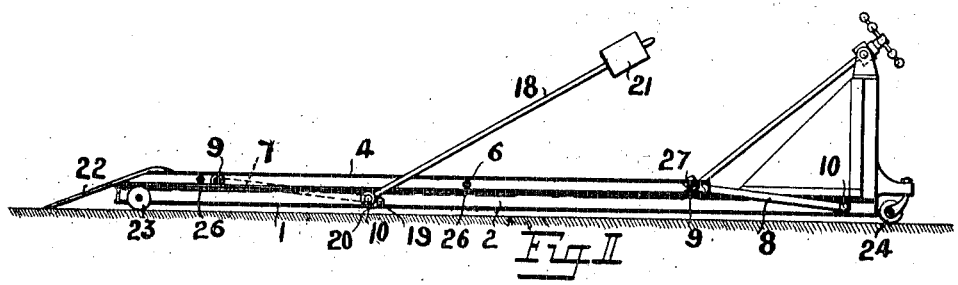
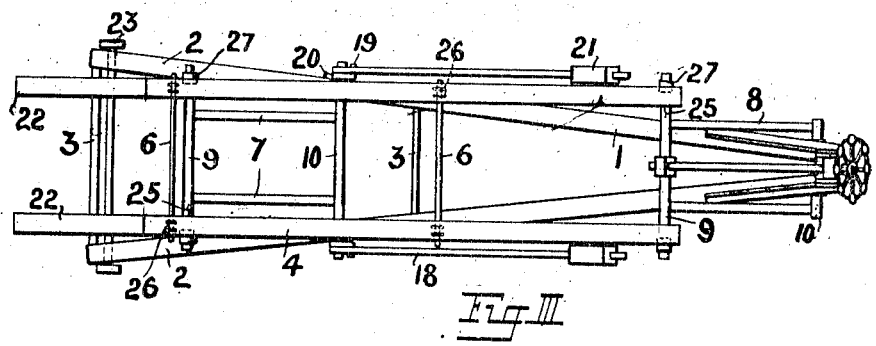
WITNESSES:
John C. Sanders
Albert F. Houman
INVENTOR:
James John Preece
BY Wm Wallace White
ATT'Y.

UNITED STATES PATENT OFFICE.

JAMES JOHN PREECE, OF POTCHEFSTROOM, TRANSVAAL, SOUTH AFRICA.

APPARATUS FOR RAISING AUTOMOBILES.

1,080,581.   Specification of Letters Patent.   Patented Dec. 9, 1913.

Application filed August 26, 1912. Serial No. 717,184.

*To all whom it may concern:*

Be it known that I, JAMES JOHN PREECE, a British subject, residing at King Edward street, Potchefstroom, in the Province of the Transvaal, Union of South Africa, have invented new and useful Improvements in Apparatus for Raising Automobiles, of which the following is a specification.

The present invention relates to apparatus for raising automobiles to allow of a person passing under the same.

Heretofore access to the under parts of an automobile has usually been obtained by means of a pit over which the automobile was drawn; or in other cases a crane or other lifting means has been employed to raise the machine to the required height.

According to this invention a structure is provided consisting of a base, an open framework forming a platform, and connections whereby the platform may be lowered to permit the automobile to be run onto it and then raised to the desired height, carrying the automobile with it.

The invention is illustrated in the accompanying drawings, in which:

Figure I is a side elevation of the apparatus with a motor car raised thereon; Fig. II is a similar view but showing the apparatus collapsed; and Fig. III is a plan of Fig. II.

The apparatus comprises a base 1 formed of beams 2. As illustrated in Fig. III, the base is triangular in shape and provided with cross stays 3, but it is obvious that any other suitable form may be used.

4 is an open framework platform consisting of two beams 5 fastened together by stays 6. Platform 4 is attached to base 1 by pairs of legs 7, 8. Two pairs of legs are shown in the drawings, but this number may be increased if a more rigid structure is required. As illustrated in Fig. III, each pair of legs is connected at the top and bottom by bars 9 and 10 respectively and such bars are revolubly connected to the platform 4 and base 1 so as to cause the platform to be raised or lowered in an arcuate path relatively to the base, as indicated by 11 (Fig. I).

12 is an upright rigidly secured to one end of base 1, and provided at its upper end with a block 13 pivotally mounted in brackets 14 so as to be capable of rotation on an axis at right angles to screw 15 passing through its center. Screw 15 engages a nut 16 secured to bar 9 and said nut is pivotally mounted similarly to block 13. Suitable means such as hand wheel 17 is provided for rotating the screw 15.

It will be understood from the drawings that rotation of screw 15 operates to move the platform 4 to its raised or lowered position as indicated by the arcs 11 (Fig. I), and said screw will hold the platform firmly in its raised position. Levers 18 may be mounted on bar 10 to assist screw 15 when starting to raise the load. As platform 4 is raised and the vertical component of its movement becomes less, the effort which it is necessary to apply to screw 15 to continue the movement decreases and the assistance of levers 18 is no longer required. They therefore are not connected directly to bar 10 but engage the same by making contact with projections 19 on collars 20 which are rigidly connected to bar 10. They are initially set at such an angle that after the platform has been partially raised, they are stopped by contact with the floor while the projections 19 move on. The levers may be furnished with weights 21.

22 are gangways secured to the platform 4 and adapted to reach the ground (as illustrated in Fig. II) to enable the automobile to be run onto the platform 4.

To facilitate movement of the structure, *e. g.* from one part of a garage to another, it may be mounted on wheels 23, 24, the forward one, 24, of which is preferably a caster.

In employing the invention to raise an automobile, the platform 4 being lowered, the car is run onto it over the gangways 22. Screw 15 is then rotated to raise the platform 4, assisted if necessary by manual force applied to the levers 18. The platform is raised until nut 16 is drawn close against block 13 in which position the legs 7 and 8 are vertical and the structure is held in such position by upright 12. The reversal of these operations lowers the automobile to the ground.

The drawings show the apparatus built of steel girders with tubular metal posts for legs; but if desired the structure may be built of wood and may have the base sunk into the ground.

A space 25 may be left on the bars 9 between the girders 5 and the legs 7 and 8 so as to allow such girders to be separated or brought together to accommodate cars differing in the width of the wheel base. For adjusting said girders the stays are screwed at their ends and provided with nuts 26 engaging the inner and outer faces of the girders. The latter are retained symmetrically with relation to the base by collars 27 adjustably secured to the bars 9.

What I claim and desire to secure by Letters Patent is:—

Apparatus for raising automobiles, comprising in combination, a triangularly shaped base, an upright at the apex of the triangle, a screw pivotally mounted on said upright, an open platform adapted to afford a support for the wheels of an automobile and provided with a pivoted nut through which said screw works, legs connecting the platform to the base and adapted to swing about their points of attachment thereto whereby the platform is adapted to be raised or lowered in an arcuate path in relation to the base by means of the aforesaid screw and nut.

In testimony whereof I have signed my name to this specification in the presence of two subscribing witnesses.

JAMES JOHN PREECE.

Witnesses:
W. HILLMAN VINCENT,
WESLEY E. JOHN.